March 7, 1944.  L. S. WILLIAMS  2,343,621
PROJECTION SYSTEM
Filed Oct. 29, 1941  4 Sheets-Sheet 1
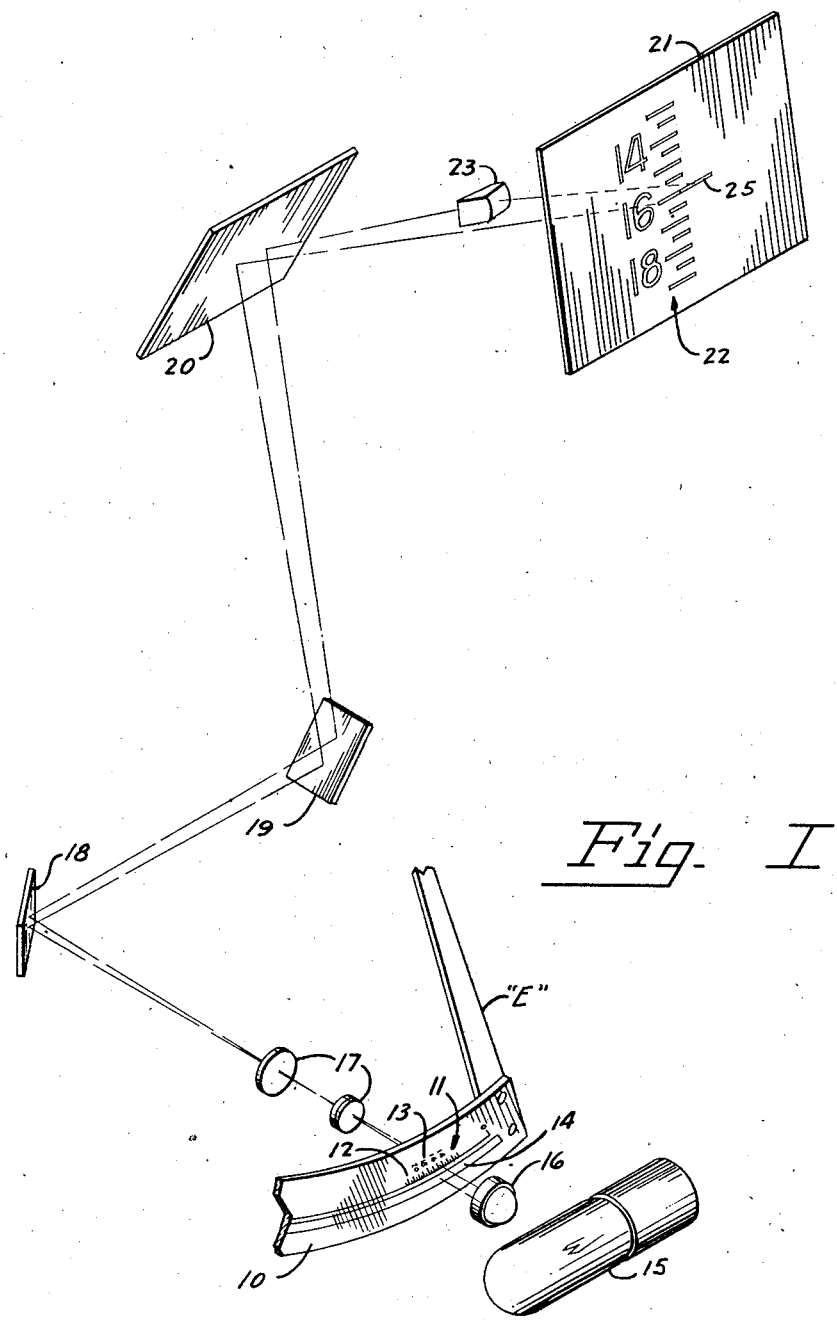
Fig. I
Lawrence S. Williams
INVENTOR
BY Marshall & Marshall
ATTORNEYS

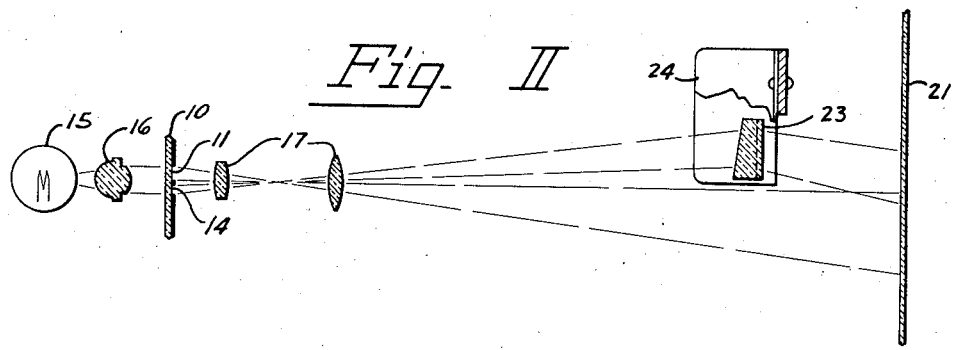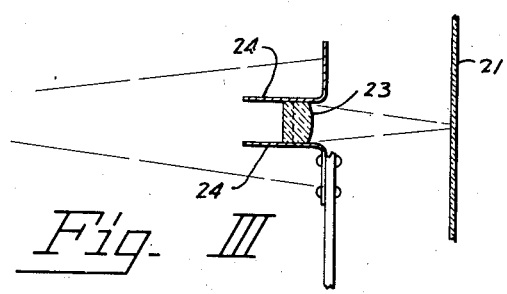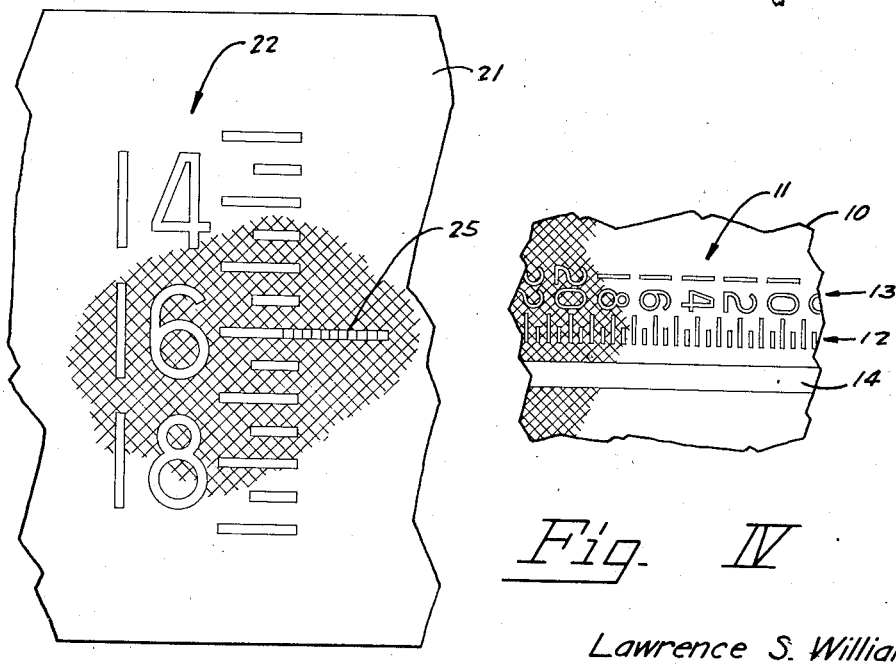

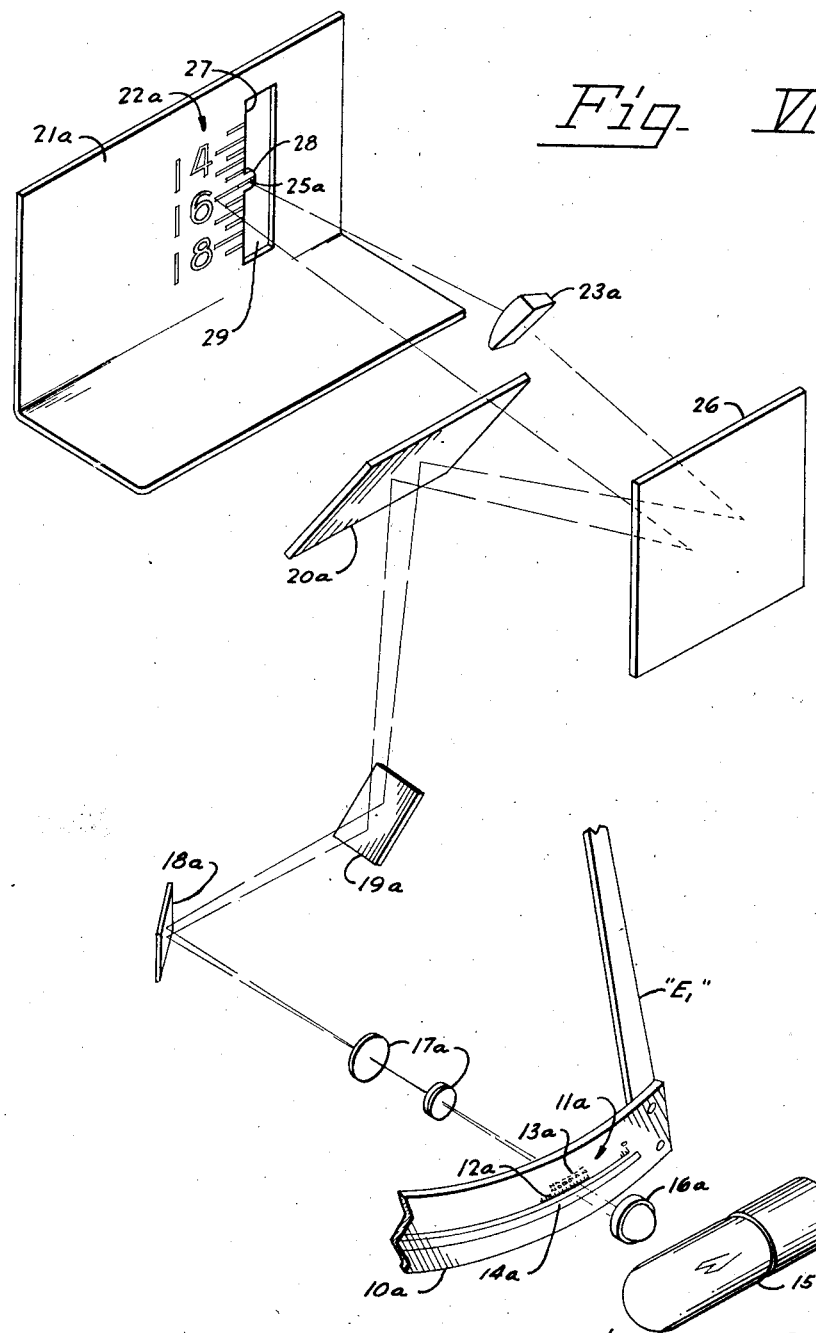

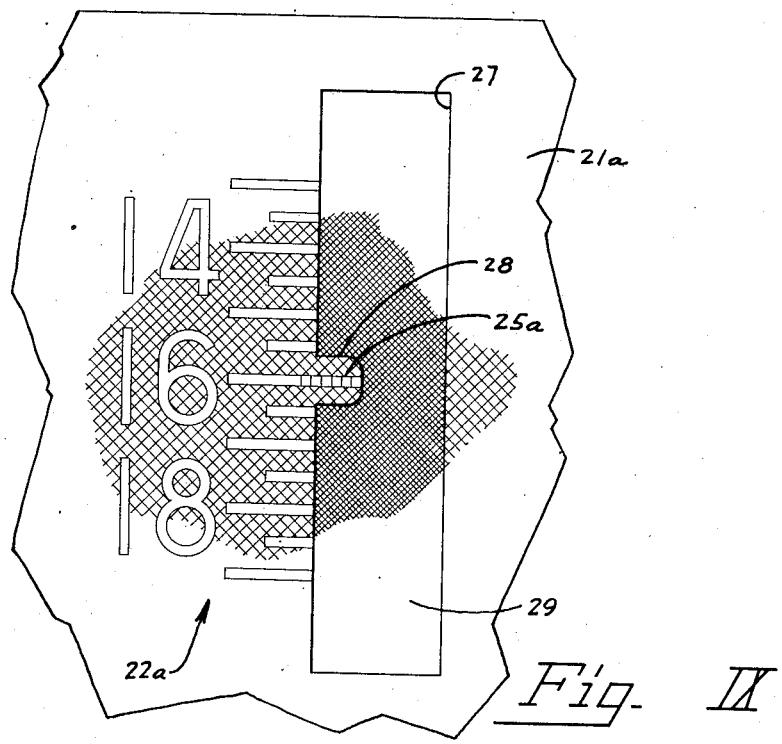
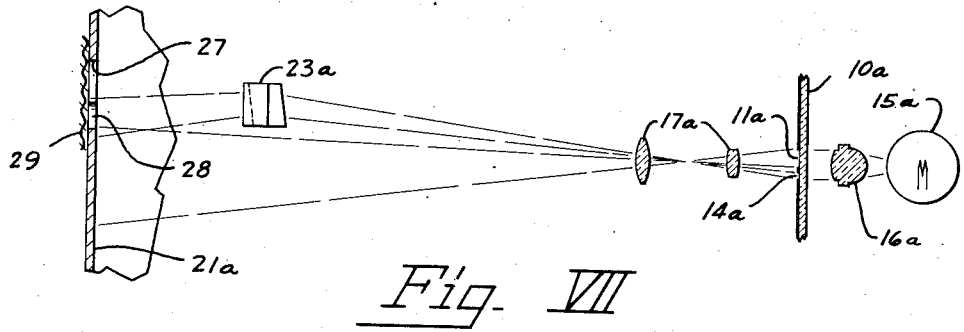
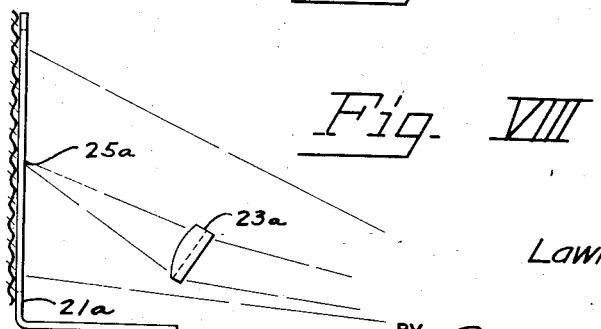

Patented Mar. 7, 1944

2,343,621

UNITED STATES PATENT OFFICE 2,343,621

PROJECTION SYSTEM

Lawrence S. Williams, Toledo, Ohio, assignor to Toledo Scale Company, Toledo, Ohio, a corporation of New Jersey Application October 29, 1941, Serial No. 416,965

8 Claims. (Cl. 88—24)

This invention relates to projection systems, and more particularly to such a system for projecting the indicia borne by a movable scale responsive to forces or conditions being measured by instruments, such as weighing scales, barometers, thermometers, electrical meters, etc.

In all of such instruments the size of the indicator or indicia bearing member which can be moved by the instrument is limited in two ways. One of these limitations is that the mass of the condition responsive element moved by the measuring mechanism must be kept small enough so that its movement does not introduce much inertia or friction into the mechanism. A second limitation is that of the distance through which such an indicator, or chart, can be moved by such a measuring instrument. If the mass of the condition responsive element of the measuring instrument is kept light enough to meet that requirement, it cannot carry indicia of sufficient size and quantity to indicate the force being measured through a sufficient degree of change. For this reason, on such measuring instruments indication is usually afforded by the combination of a fixed chart and a movable indicator.

The limitation as to the distance through which such an indicator, or chart, can be moved affects the amount of indication which can be given by means of the fixed chart and movable indicator just mentioned and also the number of indicia and breadth of indication which can be given by a movable chart. Since such a measuring instrument can move an indicator through only a somewhat limited path, in order to secure a sufficient number of indicia adjacent such path, the indicia must be relatively small; similarly, when the chart itself is moved by the recording instrument, the indicia on the chart must be relatively small.

To overcome the disadvantages mentioned, various devices have been developed which project an image of a transparent chart on either a specular or a translucent screen. However, in such devices, the principal problems have been ones of affording sufficient light to brilliantly illuminate the transparency in order to secure a brightly lighted image and the securing of a sufficient distance through which the image is transmitted to achieve the great magnification of indicia which is desirable. A further problem, in the case particularly of a movable transparent chart the image of which is projected on a screen, is the provision of a suitable contrasting fixed indicator visible on the screen adjacent to the image of the chart to indicate the actual indicium corresponding to the condition being measured.

It is an object of this invention to provide a projection system for a measuring instrument which will project the image of a transparent chart borne by the condition responsive element of such a measuring instrument with great brilliancy and through a sufficient transmission distance to provide a greatly enlarged image.

It is a further object of this invention to provide a brilliantly illuminated index adjacent the projected image of a transparent chart borne by the condition responsive element of a measuring instrument.

It is another object of this invention to provide a combination prism and lens which will both bend and focus a beam of light to provide a contrasting index adjacent the projected image of a movable chart borne past the source of light for both such index and such image by the condition responsive element of a measuring instrument.

It is still another object of this invention to provide a projection system which will provide a brilliantly illuminated, sharply defined and greatly magnified image of a transparent chart borne by the condition responsive element of a measuring instrument which image will be monoplaner in movement and have adjacent its indicia a brilliantly illuminated, contrastingly colored index.

More specific objects and advantages are apparent from the description, in which reference is had to the accompanying drawings illustrating a preferred form of scale embodying the invention.

In the drawings:

Fig. I is a view in perspective of the essential elements of a projection system embodying the invention.

Fig. II is a schematic view, partly in section, of a simplified form of the projection system illustrated in Fig. I, the view being substantially a plan of the simplified system.

Fig. III is a diagrammatic view of a portion of the system shown in Fig. II, being substantially a vertical section of through parts of Fig. II.

Fig. IV is a fragmentary view, greatly enlarged, of the chart borne by the condition responsive element of a measuring instrument.

Fig. V is a fragmentary view, greatly enlarged, of the projected image of the chart illustrated in Fig. IV projected by means of the system illustrated in Fig. I on a translucent screen.

Fig. VI is a view in perspective of the elements of a projection system incorporating a modification of the system shown in Fig. I for projection of the image onto a specular screen.

Fig. VII is a view similar to Fig. II of a simplified form of the projection system illustrated in Fig. VI.

Fig. VIII is a view similar to Fig. III but of the simplified projection system shown in Fig. VII.

Fig. IX is a fragmentary view, greatly enlarged, of the image of the chart illustrated in Fig. IV borne by the condition responsive element of a measuring instrument as it would appear when projected on a specular screen by the projection system illustrated in Fig. VI.

These specific drawings and the specific description that follows merely disclose and illustrate the invention and are not intended to impose limitations upon the claims.

An arcuately-shaped chart bearing member 10 is attached to a condition responsive element E of a measuring instrument (not shown) for oscillatory movement in one plane in response to the conditions being measured by such measuring instrument. The member 10 has mounted thereon a transparent chart 11, which is marked with indicia 12 and numerals 13 corresponding thereto. The indicia 12 and numerals 13 may be such as are required to show the conventional terms of measurement of whatever conditions are being measured by the instrument to which the condition responsive element E is attached. The indicia 12 and numerals 13 are transparent and may be produced by photographic or other means.

The chart 11 is arcuate in general form, the arc being drawn substantially about the pivot point of the condition responsive element E of the measuring instrument which supports and moves the member 10. Also located in the member 10 is a transparent arcuate strip 14 which is constructed with a slightly greater radius than the outermost edges of the indicia 12.

A source of light, such as a lamp 15, is mounted within the housing of the projection system to one side of the vertical plane of movement of the member 10. A condensing lens 16 is located between the lamp 15 and the member 10, and projecting lenses 17 are located on the other side of the member 10 from the lamp 15 and the condensing lens 16. The filament of the lamp 15 and the focal axes of the lenses 16 and 17 are on the same line which also passes by the peripheral edge of the arc along which the indicia 12 are arranged and is located with reference to the member 10 so that the light beam projected through the indicia 12 and the transparent arcuate strip 14 will pass through the strip 14 next to the indicium corresponding to the value of the condition being measured. The beam of light projected through the chart 11 and the strip 14 is divided into two separate and distinct projected beams, one of which projects an image of the indicia 12 and numerals 13 and one of which is merely a ray of light passing through the strip 14. For purposes of example, we may assume that the member 10 moves in a vertical plane and the light beam projected through it is horizontal although the reverse of these two conditions may very easily take place in certain measuring instruments.

A first surface mirror 18 is set in a vertical plane at an angle of approximately 45° to the ray of light passing through the lenses 17. The image projected therefore is reflected at approximately right angles from the direction in which it was originally projected by the lenses 17. A similar first surface mirror 19 is so mounted as to again reflect the ray of light, this time in a substantially vertical direction. A third first surface mirror 20 is so mounted as to once more reflect the image of the chart 11 and the ray of light passing through the strip 14 in another direction. As the image and the ray are reflected by the mirrors 18, 19 and 20, the rays of light carrying the image are spread further away from the ray which passed through the strip 14. Therefore, when the image and the ray strike the mirror 20, they are quite far separated.

A translucent screen 21 is mounted in the outer wall of the enclosure housing the mechanism of the measuring instrument and the elements of the projecting system and receives the projected and reflected image of the chart 11 directly. This image is illustrated in Figs. I and V and is designated by the reference numerals 22. Depending upon the plane of movement of the member 10 and the plane in which the screen 21 is located, the mirrors 18, 19 and 20 may be adjusted to transmit the image to arrive on the screen 21 in a single focal plane.

The ray of light which originally passed through the translucent strip 14 has been separated from the light bearing the image of the chart 11 and passes through a combination prism and lens 23 which is interposed between the mirror 20 and the translucent screen 21. The prism and lens 23 is mounted in a light shield 24 which prevents any light from "spilling" around the prism onto the screen. As can be seen in Figs. II and III, the combination lens and prism 23 not only prismatically bends the ray of light so that one edge overlaps one edge of the image of the indicium 12 adjacent which it originated (Fig. II) but also focuses the ray of light into a narrow strip the same width as the image of that indicium 12 adjacent which the ray originated Fig. III). The combination lens and prism 23 is preferably constructed of colored glass to form a contrasting index; ruby colored glass, for example, forms a very conspicuous indication. Thus, the ray of light which passes through the transparent strip 14 adjacent one of the indicia 12 is magnified and projected onto the screen 21 immediately adjacent the image of that indicium next to which it originated. As the member 10 moves arcuately in response to the conditions being measured on the measuring instrument to which it is attached, the chart 11 is swung through the light condensed by the lens 16. Since the strip 14 is arcuate and extends the entire length of the chart 11, a ray of light is at all times passing through the strip 14 and the projection system and forming a stationary, contrasting, brilliantly defined and lighted index 25 on the screen 21.

The projection system illustrated in Fig. VI is a modification of that already described, for use with a specular screen. A lamp 15a is the source of light which is condensed by a lens 16a and passes through a transparent chart 11a carried by an arcuate member 10a which is attached to a condition responsive element E₁ of a condition measuring instrument (not shown). The chart 11a comprises indicia 12a and numerals 13a corresponding thereto. A transparent arcuate strip 14a, having a slightly greater radius than the outermost edge of the indicia 12a, is also located in the path of the light condensed by the lens 16a. Projection lenses 17a are located in the light path on the opposite side of the plane of movement of the member 10a from the lens 16a and the lamp 15a.

As described with reference to the system illustrated in Fig. I, concentrated light rays pass through the chart 11a and the lenses 17a and are reflected by mirrors 18a, 19a and 20a to direct them towards the portion of the housing of the system where the screen is located. The mirrors 18a, 19a and 20a are mounted as far apart as possible to pass the light rays through as long a transmission distance as possible and thus increase the magnification of the image of the chart 11a. However, in the transmission system for use with a specular screen, a fourth mirror 26 is placed approximately in the position which was occupied by the screen 21 in the system shown in Fig. I. A specular screen 21a is placed in the path of the light reflected from the mirror 26 and receives a projected image 22a of the chart 11a. An opening 27 in the screen 21a has a greater vertical dimension than its horizontal dimension and is located so that its edge nearest the image of the numerals 13a forms a sharply defined terminal line for the edge of the projected image 22a. A tab 28 extends into the opening 27 from the side near the projected image 22a.

A combination prism and lens 23a is located in the path of the reflected light ray which passes through the transparent strip 14a and, as shown in Figs. VII and VIII not only prismatically bends this ray on a horizontal plane toward the image 22a of the indicia 12a but also narrows it into a thin horizontal index 25a which falls on the tab 28 immediately adjacent the edge of the image 22a. A piece of nonreflecting, light-absorbent material 29, such as velvet, is located immediately behind the opening 27 in the screen 21a and prevents reflection of any portion of the image 22a or any portion of the index 25a which falls within the opening 27.

The combination of the bright index 25a, which is preferably of a conspicuously contrasting color, such as ruby, with the sharply defined edge of the image 22a, caused by the edge of the opening 27 and the light absorbent material 29 located therein, forms a brilliantly illuminated and greatly magnified indicating means for the measuring instrument, to the condition responsive element of which the member 10a is attached.

The embodiments of the invention that have been disclosed may be modified to meet various requirements.

Having described the invention, I claim:

1. A projection system for a measuring instrument comprising a movable chart having transparent indicia, said chart being operatively connected to the condition responsive element of such instrument, a light source, condensing and projecting lenses, said light source and said condensing lens being located on one side of said movable chart and said projecting lenses being located on the same axis as said light source and said condensing lenses and on the other side of said movable chart, a transparent area in said chart slightly spaced from said transparent indicia, a screen located to receive the image of said indicia and a combination prism and lens located in the path of the light rays passing through said transparent area, said combination prism and lens bending and focusing such rays to form an index on said screen in a fixed position immediately adjacent the edge of the image of that one of said indicia registered with the axis of said lenses by movement of such condition responsive element of such instrument to indicate the value of the condition being measured by such instrument.

2. A projection system for a measuring instrument comprising a movable chart having transparent indicia, said chart being operatively connected to the condition responsive element of such instrument, a light source, condensing and projecting lenses, said light source and said condensing lens being located on one side of said movable chart and said projecting lenses being located on the same axis as said light source and said condensing lenses and on the other side of said movable chart, a screen, a transparent area in said chart spaced from the outside of said transparent indicia, mirrors located to reflect the image of such chart and the light rays passing through said transparent area onto said screen, and a combination prism and lens located in the path of such light rays between the last of said mirrors and said screen, said combination prism and lens bending and focusing such rays on said screen in a fixed position as an index immediately adjacent the edge of the image of that one of said indicia registered with the axis of said lenses by movement of such condition responsive element of such instrument to indicate the value of the condition being measured by such instrument.

3. In a measuring instrument, in combination, a member movable in response to change in magnitude of a condition under measurement, a transparent chart representing terms of measurement for such change in magnitude and operatively connected to said member, a source of light, condensing and projecting lenses disposed to project a light beam from said source through said chart at right angles to the plane of movement of said chart and to create two divergent beams of light, one beam bearing an image of said chart, a combination prism and lens disposed in the path of the other beam for bending such beam in one plane and focusing such beam in a plane at right angles thereto to form an index for the projected image of said chart, and a screen for receiving such image and such index.

4. The combination with the condition responsive element of a measuring instrument, of a transparent chart operatively attached to such element, means for projecting an image of said chart and a beam of light originating therewith on a screen, and a combination prism and cylindrical lens disposed in the path of such beam of light for bending and focusing such beam into a line on such screen to serve as an index for such chart image.

5. The combination with the condition responsive element of a measuring instrument, of a transparent chart operatively attached to such element, means for projecting an image of said chart and a beam of light originating therewith onto a screen, and a tinted combination prism and cylinder lens disposed in the projected path of such beam of light for forming a contrasting-color bright-line index in juxtaposition with such image on such screen.

6. A projection system for a measuring instrument comprising a transparent chart operatively attached to the condition responsive element of such instrument, a specular screen, means for projecting an image of said chart onto a part of said screen, said screen having a vertically disposed opening in juxtaposition with one edge of the part upon which said means projects such image, and a light absorbent, nonreflecting substance disposed in such opening, the edge of said screen adjacent the opening therein thus forming a definite terminus for the indicia marks of such image of said chart.

7. A projection system for a measuring instrument comprising a transparent chart operatively attached to the condition responsive element of such instrument, a specular screen, means for projecting an image of said chart and a beam of light originating with such image onto said screen, said screen having a vertically disposed opening, in juxtaposition with one edge of which said means projects such image, and a combination prism and lens disposed in the path of such beam of light for focusing such beam in one plane and bending such beam in another plane at right angles thereto to form an index adjacent such projected image on said screen.

8. A projection system for a measuring instrument comprising a transparent chart operatively attached to the condition responsive element of such instrument, a specular screen, means for projecting an image of said chart and a beam of light originating with such image onto said screen, said screen having a vertically disposed opening in juxtaposition with one edge of which said means projects such image, a combination prism and lens disposed in the path of such beam of light for focusing such beam in one plane and bending such beam in another plane at right angles thereto to form an index adjacent such projected image on said screen, and a light-absorbent nonreflecting substance located behind such opening, the edge of said screen adjacent the opening therein thus forming a definite terminus for the indicia marks of such image of said scale and for said index.

LAWRENCE S. WILLIAMS.